US010024273B2

United States Patent
Filippi et al.

(10) Patent No.: US 10,024,273 B2
(45) Date of Patent: Jul. 17, 2018

(54) FUEL INJECTOR (71) Applicant: CONTINENTAL AUTOMOTIVE GMBH, Hannover (DE)

(72) Inventors: Stefano Filippi, Castel' Anselmo (IT); Mauro Grandi, Leghorn (IT); Francesco Lenzi, Leghorn (IT); Valerio Polidori, Leghorn (IT)

(73) Assignee: Continental Automotive GmbH, München (DE)

( * ) Notice: Subject to any disclaimer, the term of this patent is extended or adjusted under 35 U.S.C. 154(b) by 0 days.

(21) Appl. No.: 15/288,933

(22) Filed: Oct. 7, 2016

(65) Prior Publication Data

US 2017/0101966 A1 Apr. 13, 2017

(30) Foreign Application Priority Data

Oct. 9, 2015 (EP) ..................................... 15189150

(51) Int. Cl.
*F02M 21/02* (2006.01)
*F02M 51/06* (2006.01)

(52) U.S. Cl.
CPC .... *F02M 21/0257* (2013.01); *F02M 21/0215* (2013.01); *F02M 21/0254* (2013.01); *F02M 21/0269* (2013.01); *F02M 51/0607* (2013.01); *Y02T 10/32* (2013.01)

(58) Field of Classification Search
CPC ............... F02M 21/02; F02M 21/0257; F02M 21/0215; F02M 21/0254; F02M 51/06; F02M 51/067
See application file for complete search history.

(56) References Cited

U.S. PATENT DOCUMENTS

| 3,888,273 | A | * | 6/1975 | Douglas | ............... | E21B 43/123 |
| | | | | | | 137/155 |
| 5,706,787 | A | * | 1/1998 | Fujikawa | ........... | F02M 51/0653 |
| | | | | | | 123/456 |
| 6,364,221 | B1 | | 4/2002 | Czimmek | | |
| 6,405,947 | B2 | * | 6/2002 | Fochtman | .......... | F02M 51/0671 |
| | | | | | | 239/585.4 |
| 6,422,488 | B1 | * | 7/2002 | Fochtman | .......... | F02M 51/0614 |
| | | | | | | 239/585.1 |

(Continued)

FOREIGN PATENT DOCUMENTS

| DE | | 4141274 A1 | * | 6/1993 | ............. | F02M 59/02 |
| DE | 102008041544 A1 | | | 3/2010 | | |

(Continued)

OTHER PUBLICATIONS

European Search Report for EP priority application 15189150.4, European Patent Office, dated May 16, 2016.

*Primary Examiner* — Hieu T Vo (57) ABSTRACT

A fluid injector is shown and described, including an injector housing and an armature which is coupled to a valve needle. A first bellow surrounds a first space. A first axial end of the first bellow is connected to the injector housing and a second axial end of the first bellow is connected to a first axial side of the armature. A second bellow surrounds a second space. A first axial end of the second bellow is connected to a second axial side of the armature and a second axial end of the second bellow is connected to the housing.

20 Claims, 8 Drawing Sheets

(56) References Cited

U.S. PATENT DOCUMENTS

| | | | | |
|---|---|---|---|---|
| 6,796,511 B2* | 9/2004 | Hohl | ............... | F02M 45/083 239/5 |
| 9,683,519 B2* | 6/2017 | Jaegle | ............... | F02M 21/0275 |
| 2015/0001319 A1 | 1/2015 | Foerster et al. | | |
| 2017/0101965 A1* | 4/2017 | Grandi | ............... | F02M 21/0254 |

FOREIGN PATENT DOCUMENTS

| | | | | |
|---|---|---|---|---|
| EP | 2568155 A1 | 3/2013 | | |
| EP | 2818680 A2 | 12/2014 | | |
| EP | 3070321 A1 * | 9/2016 | ............. | F02M 43/04 |
| JP | 60200023 A * | 10/1985 | ............... | F23R 5/00 |

\* cited by examiner

FUEL INJECTOR

CROSS REFERENCE TO RELATED APPLICATION

This application claims priority, under 35 U.S.C. 119, to European patent application EP15189150.4, filed Oct. 9, 2015, the content of which is hereby incorporated by reference herein in its entirety.

TECHNICAL FIELD

The present invention refers to a fluid injector, in particular for direct injection (DI) of compressed natural gas (CNG) into a combustion chamber of a combustion engine.

BACKGROUND

A fluid injector is known from German patent application DE 10 2008 041 544 A1. CNG direct injector design is a new technology that aims to use DI CNG injection in large scale on automotive passenger car applications with theoretical benefit in terms of emission reduction, including NOx and CO, and improved combustion efficiency. However, no solution for large scale automotive applications is available today.

SUMMARY

The problem that the present invention aims to solve is in particular related to the use of a fluid injector of the mentioned generic type for direct injection (DI) of compressed natural gas (CNG). Direct injection natural gas engines have been reported to have a higher thermal efficiency and a higher power output compared to conventional port fuel gas systems. Main problems to be solved for this application are gas containment and the gas quantity to be delivered in a time limited by the engine speed. The present invention aims to improve a generic fluid injector, in particular by regarding these specific conditions and in particular by using a DI CNG solenoid actuator design which is able to support a CNG DI system.

Embodiments of the present invention include a fluid injector. The fluid injector comprises an injector housing. The fluid injector further comprises an injector inlet, an injector outlet and a fluid supply line extending along a longitudinal axis between the injector inlet and the injector outlet.

The fluid injector additionally comprises a valve needle, a coil and an armature. The valve needle is axially moveable parallel to the longitudinal axis. The armature is mechanically coupled to the valve needle so that it is, in particular, operable to move the valve needle axially. The armature may be fixed to the valve needle. Alternatively, the armature and the valve needle may have an axial play relative to each other. Expediently, the coil and the armature are comprised by an electromagnetic actuator assembly, i.e., a solenoid actuator, of the fluid injector. The armature, for moving the valve needle, is in particular axially displaceable towards the coil by means of an electromagnetic field which is generated by the coil when the electromagnetic actuator assembly is energized.

The fluid injector further comprises a first bellow surrounding a first space, wherein a first axial end of the first bellow is connected to the injector housing so that the first space is in fluid communication with the injector inlet, and wherein a second axial end of the first bellow is connected to a first axial side of the armature. Thus, the first bellow may extend from its second axial end axially away from the armature to its first axial end so that the first space extends from the first axial side of the armature towards the fluid inlet.

Additionally, the fluid injector comprises a second bellow surrounding a second space, wherein a first axial end of the second bellow is connected to a second axial side of the armature, and wherein a second axial end of the second bellow is connected to the injector housing so that the second space is in fluid communication with a section of the fluid supply line, which is adjacent to the injector outlet. Thus, the second bellow may extend from its first axial end axially away from the armature to its second axial end so that the second space extends from the second axial side of the armature towards the fluid outlet.

The new injector could be used for DI CNG high pressure applications. The double bellow design, according to the embodiments of the invention, enables a number of advantages. The new injector permits a high lift of the armature and the valve needle and accordingly it allows a big opening section at the injector outlet in its opened state. If required, this enables the supply of a large gas quantity in a short time limited by the engine speed. The double bellow design also facilitates the containment of the gas in order to avoid leakages or the like.

In a preferred embodiment, the armature has at least one throughout hole (i.e. one or more throughout holes) extending along the longitudinal axis. A "throughout hole" may also be denoted as a "through-hole." The second axial end of the first bellow is connected to the first axial side of the armature so that the first space is in fluid communication with the at least one throughout hole. Further, the first axial end of the second bellow is connected to the second axial side of the armature so that the second space is in fluid communication with the at least one throughout hole. This improves the containment of the fluid, especially of a CNG, to be supplied and avoids a contamination of the supplied fluid. The term "throughout hole" is to be understood to mean a through-hole.

In an embodiment, it is provided that the interior of the fluid supply line is sealed off from the coil, wherein the connections at the axial ends of the bellows are tightened by hermetic welds, in particular by hermetic laser welds. In other words, the first and second bellows define portions of the fluid line and contribute to hydraulically sealing the fluid line. Fluid may flow through the bellows from the injector inlet to the injector outlet. The outer circumferential surfaces of the bellows may be sealed from the fluid which flows through the injector and is dispensed from the fluid injector at the fluid outlet in operation. This provides the possibility of a "dry" solenoid, i.e., a solenoid actuator which can be operated without direct contact with the supplied fluid. The magnetic circuit may be completely separated from the fluid path, and in particular the gas path.

Preferably the fluid injector comprises a valve assembly of the outward opening type. Accordingly, the design for supply of compressed natural gas could be denoted "SONG-design" (Solenoid Outward Natural Gas design).

In one embodiment, the valve assembly comprises a valve seat, in particular formed at the injector housing, and a closing member, which is connected to or formed at an axial end of the valve needle. It is preferred that the valve seat comprises a first circular sealing surface, that the closing member comprises a second circular sealing surface and that in the closed state of the valve assembly, the first circular sealing surface and the second circular sealing surface contact each other in a circular contact area which is closed at the circumference. The circular contact area—by extending along the circumference and by extending in a radial direction—has a two-dimensional extension. This enables the provision of a large sealing band which is of advantage to support the specific needs of CNG delivery. Preferably the contact area is flat. Specifically, the circular contact area may be comprised by a plane which is perpendicular to the longitudinal axis. In particular, the circular contact area is in the shape of a circular ring which has a surface normal parallel—and in particular coaxial—to the longitudinal axis. This may improve gas flow rate and lifetime performances.

It is preferred that the coil is a component of a solenoid circuit, which in particular is a dual pole solenoid circuit. This allows a high force which may support to the operation of the actuator under operative conditions requested for DI of CNG, especially if used for DI CNG high pressure applications. Preferably the cross-section of the space of the second bellow exceeds a cross-section of the space of the first bellow. If the valve is in the closed state and the gas pressure inside the fluid supply line increases, the gas pressure cannot unintentionally open the valve. Preferably the first bellow and the second bellow may be made of elastic material, which preferably may be a metallic material (e.g. steel) or which may be, for example, plastic, rubber or the like. It is preferred that the bellows have spring-like elastic properties.

In an embodiment, the fluid injector comprises a first compression spring which is axially clamped between the first axial side of the armature and the injector housing. The fluid injector may comprise an adjusting means for adjusting the axial compression of the first compression spring. The adjusting means may comprise a fluid filter, which may be fixed within the fluid supply line at different axial positions, wherein an appropriate axial position can be chosen depending on the required axial force.

It is preferred that the fluid injector comprises a second compression spring which is axially clamped between the second axial side of the armature and the injector housing. This may improve a contact mechanism and the wearing robustness between the housing (in particular, a cartridge of the housing) and the needle on using gas media. It is preferred that the axial forces of the first bellow, the second bellow and the first compression spring are balanced with each other and in particular with a gas pressure in the fluid supply line so that in a de-energized state of the coil, the armature is held axially movable in both axial directions in an axial distance away from the coil or away from a casing which is surrounding the coil. This provides a pressure balanced function. As an alternative, an unbalanced state of the armature may be possible. If the fluid injector comprises a second compression spring, it also may be included in the before-mentioned balance. The balanced/unbalanced state may be realized with a double wave spring, bellows design solution.

Further, it is preferred that the first bellow is circumferentially surrounded by a hollow cavity which is in fluid communication with a fluid connector of the injector housing, wherein the fluid connector in particular is connected to a source of cooled fluid or to a source of heated fluid, and/or that the second bellow is circumferentially surrounded by a hollow duct which is in fluid communication with a fluid connector of the injector housing, wherein the fluid connector, in particular, is connected to a source of cooled fluid or to a source of heated fluid. This enables better stability of the fluid temperature in the fluid supply line, i.e., a better stability of the gas to be supplied, that directly impacts on the gas density and consequently the required mass flow.

According to a second aspect, the present invention comprises a fluid injector, in particular for direct injection (DI) of compressed natural gas (CNG) into a combustion chamber of a combustion engine, wherein:
the fluid injector comprises a valve assembly of the outward opening type,
the valve assembly comprises a valve seat, in particular formed at the injector housing, and a closing member which is connected to or formed at an axial end of the valve needle,
the valve seat comprises a first circular sealing surface,
the closing member comprises a second circular sealing surface and
in the closed state of the valve assembly, the first circular sealing surface and the second circular sealing surface contact each other in a circular contact area which is closed at the circumference, wherein the circular contact area, by extending along the circumference and by extending in a radial direction, has a two-dimensional extension.

Specifically, the circular contact area may be comprised by a plane which is perpendicular to the longitudinal axis. In particular, the circular contact area is in the shape of a circular ring which has a surface normal parallel—and in particular, coaxial—to the longitudinal axis. Regarding technical effects and advantages, reference is made to the respective description above and below. Also regarding the second aspect of the invention there are many possibilities to perform preferred modifications. For this purpose, a fluid injector, according to the second aspect of the invention, may comprise one or more features as described above and in the following.

Regarding the aspects of the present invention, the injector preferably comprises an outward opening solenoid actuator. To support the specific needs of CNG delivery, it is preferred a large gas passage area, which can be provided by a large sealing band and a high lift. To support the actuator design performances it is possible that the solenoid circuit is a dual pole solenoid circuit design. Preferred is a dual pole solenoid circuit design, which is able to be operated not in direct contact with the CNG gas. The embodiments of the present invention allow this by use of a double bellow design. The embodiments of the present invention provide both improved gas containment functions and a high force, which may be required to operate the actuator under the above described operating conditions.

By use of the double bellow design, embodiments of the invention provide a gas path and a separate magnetic circuit. As described above, such design enables a pressure balanced function. Further, such design is helpful to avoid contamination of the supplied fluid.

A particular advantage of a suggested solenoid outward natural gas injector (SONG injector) is to have an internal gas path separated from the solenoid circuit by use of bellows and, in particular, hermetic welds. A gas path and a balanced architecture can be realized with the described double bellow design. An internal room of the actuator, which is external to the gas, can be used as a cooler or a heater (for example by using air) to improve better stability of the gas temperature that directly impacts on the gas density and consequently the required mass flow.

According to a third aspect of the invention, a fluid injector is provided for direct injection of compressed natural gas into a combustion chamber of a combustion engine, in particular of a vehicle.

According to a fourth aspect of the invention, a method of operating a fluid injector provides a combustion engine comprising at least one combustion chamber and at least one fluid injector and operates the combustion engine by using the fluid injector for directly injecting compressed natural gas into the combustion chamber.

Further areas of applicability of the present invention will become apparent from the detailed described provided below. It should be understood that the detailed description and the specific example embodiments, while indicating preferred embodiments, are intended for purposes of illustration only and are not intended to limit the scope of the invention.

BRIEF DESCRIPTION OF DRAWINGS

Exemplary embodiments of the invention are explained in the following with regard to the attached figures. The figures show:

FIG. 1b is an enlarged view of details of the area Ib in FIG. 1.

DESCRIPTION OF THE EMBODIMENTS

The following description of preferred embodiments is merely exemplary in nature and is in no way intended to limit the invention, its application or uses.

A first preferred embodiment of a fluid injector 1 according to the invention will be described with reference to FIGS. 1 and 2. The embodiment is adapted for direct injection of compressed natural gas into a combustion chamber (not shown in the figures) of a combustion engine. The fluid injector 1 comprises an injector housing 2, an injector inlet 3, an injector outlet 4 and a fluid supply line 5. The fluid supply line 5 extends along a longitudinal axis L between the injector inlet 3 and the injector outlet 4. Further, fluid injector 1 comprises a coil 6, which extends around the longitudinal axis L and which is inserted in a cavity of a casing 7. By broken lines, it is schematically indicated that coil 6 is or can be connected by lines 8 to a control unit 9 in order to energize coil 6 by applying an electrical current or to de-energize the coil 6. The control unit 9 may be separated from or may be a component of the fluid injector 1.

The fluid injector 1 comprises a valve needle 10, which extends central along the longitudinal axis L and which is axially moveable in directions parallel to the longitudinal axis L. Further, the fluid injector 1 comprises an armature 11, which is fixed to the valve needle 10, for example by welding, so that the fixation can withstand axial forces. The armature 11 comprises a disc-shaped section 12, which due to its diameter, overlaps a respective axial end of coil 6 and casing 7. Armature 11 also comprises an axial projection 13, which is integrally connected to the center of the disc-shaped section 12 and which extends into a bore 14 of casing 7 by axially overlapping the coil 6. Coil 6 is part of a solenoid actuator, wherein coil 6, casing 7 and armature 11 are components of a magnetic path. The armature 11 preferably may be made of a ferromagnetic material, which is not permanently magnetized, like, for example, steel. Accordingly, if the coil 6 is energized, due to the resulting magnetic forces the armature 11 will be attracted in a direction parallel to the longitudinal axis L and towards the coil 6.

Further, the fluid injector 1 comprises a first bellow 15 surrounding a first space 16. A first axial end 17 of the first bellow 15 is connected in a sealing manner to an adapter 18, which is connected in a sealing manner to a head section 19 of the injector housing 2. Hence, by means of the adapter 18, the first axial end 17 of the first bellow 15 is connected to the injector housing 2. The connection is such that the first space 16 is in fluid communication with the injector inlet 3. The second axial end 20 of the first bellow 15 is connected in a sealing manner to an adapter 23, which is connected in a sealing manner to a first axial side 21 of the armature 11. Accordingly, by means of the adapter 23, the second axial end 20 is connected to the armature 11. The latter has a number of throughout holes 22 extending parallel to the longitudinal axis L. The throughout holes 22 are laterally spaced from each other and are positioned distributed at a circumference around the longitudinal axis L. The first bellow 15 is connected to the armature 11 in a manner, such that the first space 16 is in fluid communication with the throughout holes 22.

Further, the fluid injector 1 comprises a second bellow 24, which is surrounding a second space 25. A first axial end 26 of the second bellow 24 is connected in a sealing manner to an adapter 27, which is connected in a sealing manner to a second axial side 28 of the armature 11. Accordingly, by means of the adapter 27, the bellow 24 is connected to the armature 11. The connection is such that the second space 25 is in fluid communication with the throughout holes 22. A second axial end 29 of the second bellow 24 is connected in a sealing manner to an adapter 30, which is connected in a sealing manner to a first axial end of a cartridge 32, which is part of the injector housing 2. Accordingly, by means of the adapter 30, the second bellow 24 is connected to the injector housing 2. The connection is such that the second space 25 is in fluid communication with a section 33 of the fluid supply line 5, wherein section 33 is adjacent to the injector outlet 4.

The injector housing 2 comprises a number of components, including the casing 7, the head section 19, the cartridge 32, a jacket 34 and a plate 39, which are mounted together. The fluid supply line 5 extends between the injector inlet 3 and the injector outlet 4 and comprises a first line section 35, the first space 16, the throughout holes 22, the second space 25 and a ring-shaped second line section 36 between the valve needle 10 and the cartridge 32. FIG. 1 shows that the valve needle 10 comprises two extended guiding sections 37 (FIG. 2c), 38 (FIG. 2d) having flat areas at its sides to allow fluid passing.

From the above, it is clear that the interior of the fluid supply line 5 is sealed off from the coil 6, a cavity 40 inside jacket 34, and from a hollow duct 41 between casing 7 and the second bellow 24. The connections between the axial ends of the bellows 15, 24 and the adapters 18, 23, 27, 30, and the connections between such adapters and the beforementioned components may be formed or tightened by hermetic welds (not shown), and in particular by hermetic laser welds.

Figure 2:
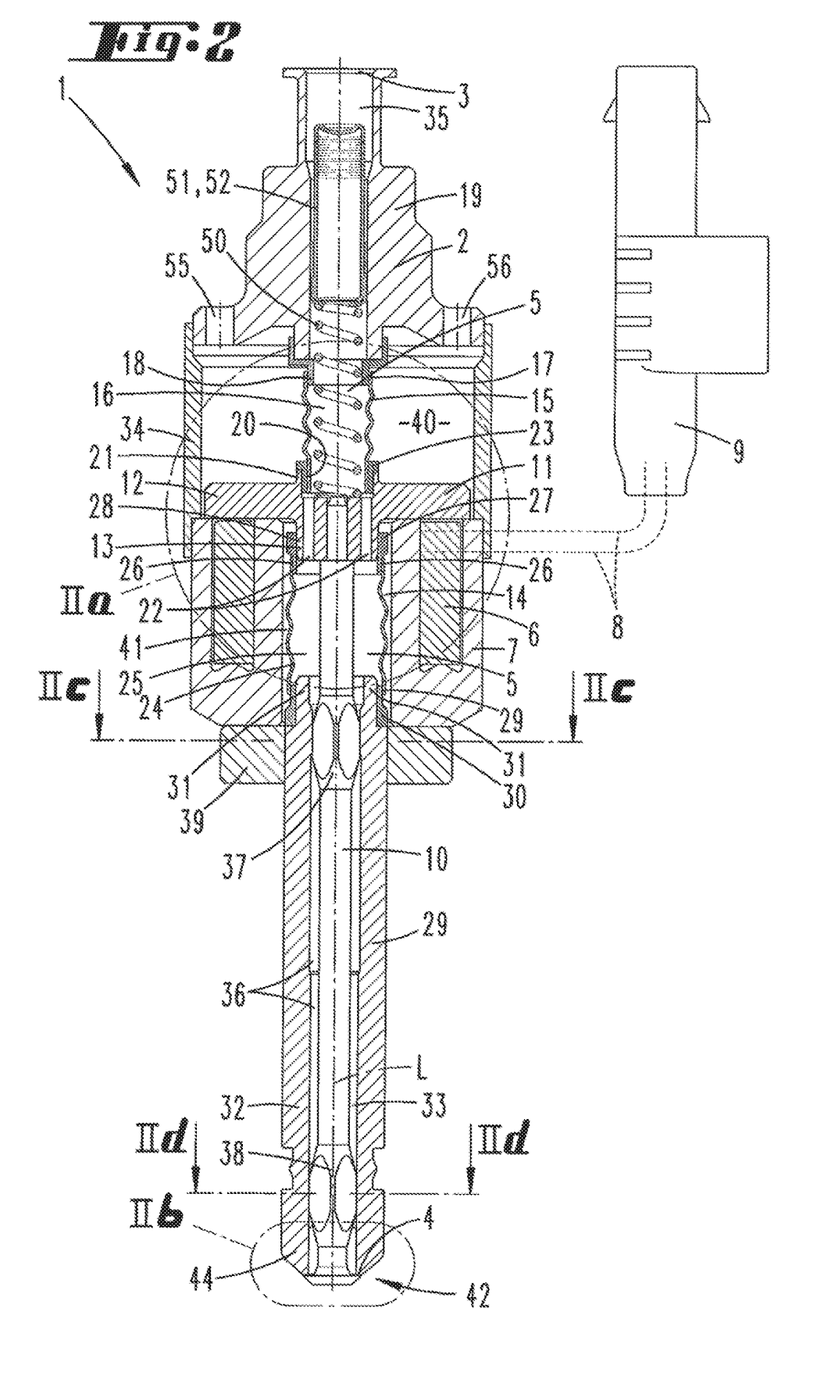
FIG. 2 is a sectional view the embodiment of FIG. 1, however in an opened operating state.
Figure 2A:
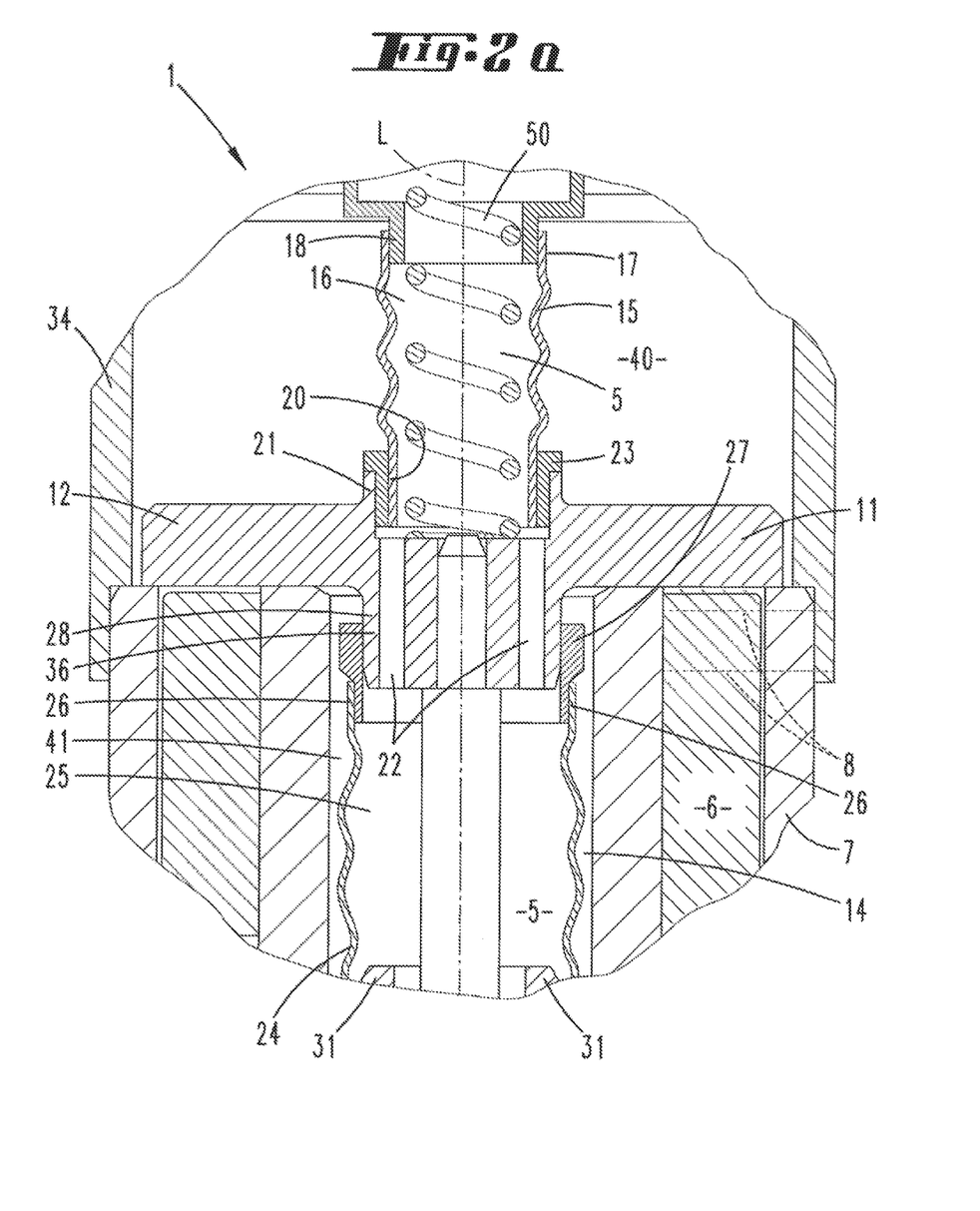
FIG. 2a is an enlarged view of details of the area IIa in FIG. 2.
Figure 2B:
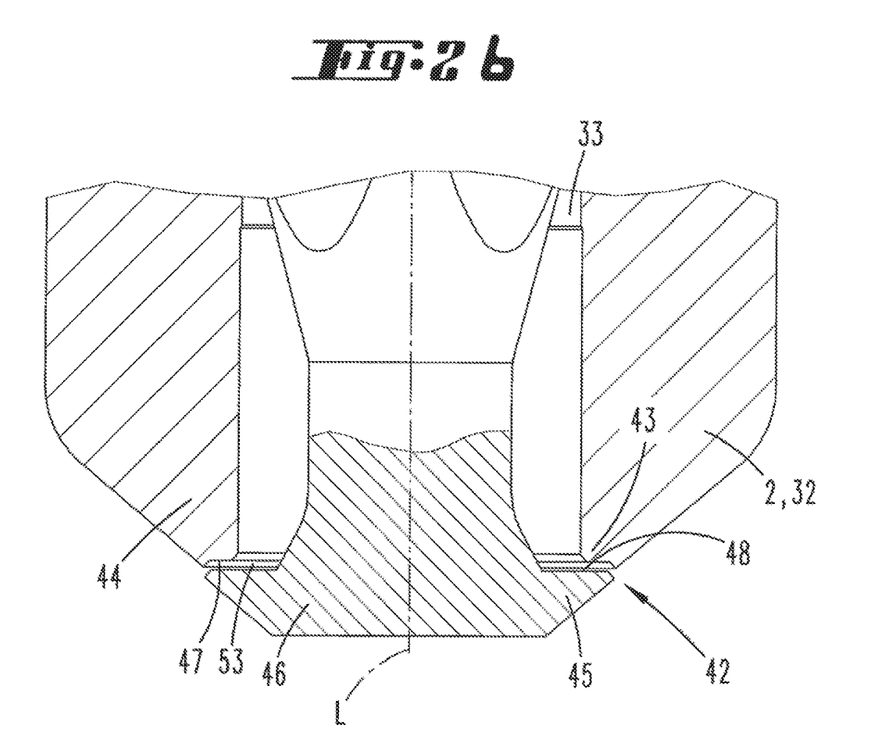
FIG. 2b is an enlarged view of details of the area IIb in FIG. 2.

With reference to FIG. 2b, the fluid injector 1 comprises a valve assembly 42 of the outward opening type. The latter comprises a valve seat 43, which is formed by the second axial end 44 of the cartridge 32. Further, the valve assembly 42 has a closing member 45, which is formed at an axial end 46 of the valve needle 10. The valve seat 43 comprises a first circular sealing surface 47. The closing member 45 comprises a second circular sealing surface 48.

Figure 1:
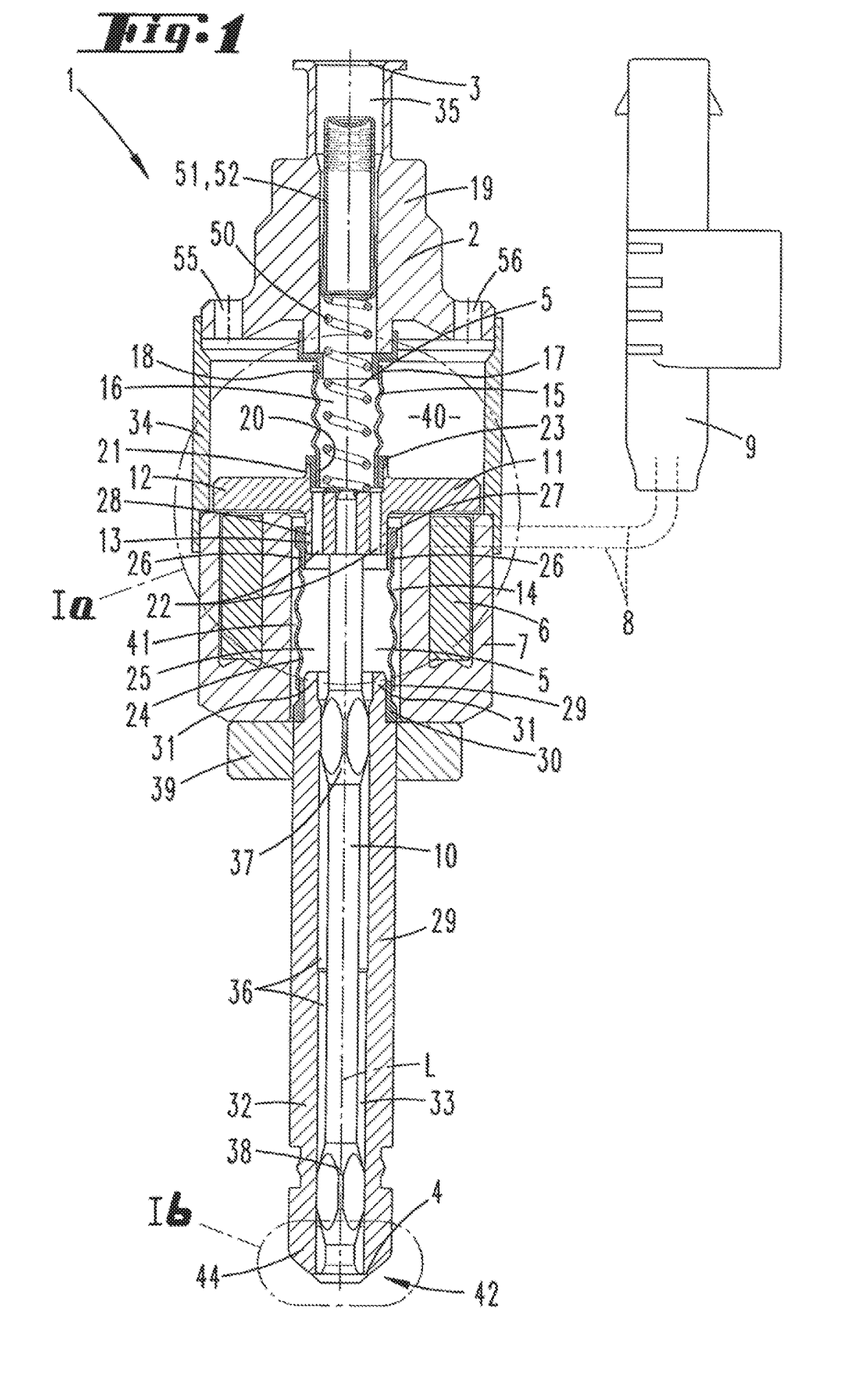
FIG. 1 is a sectional view of an exemplary embodiment of a fluid injector in a closed operating state.
Figure 1A:
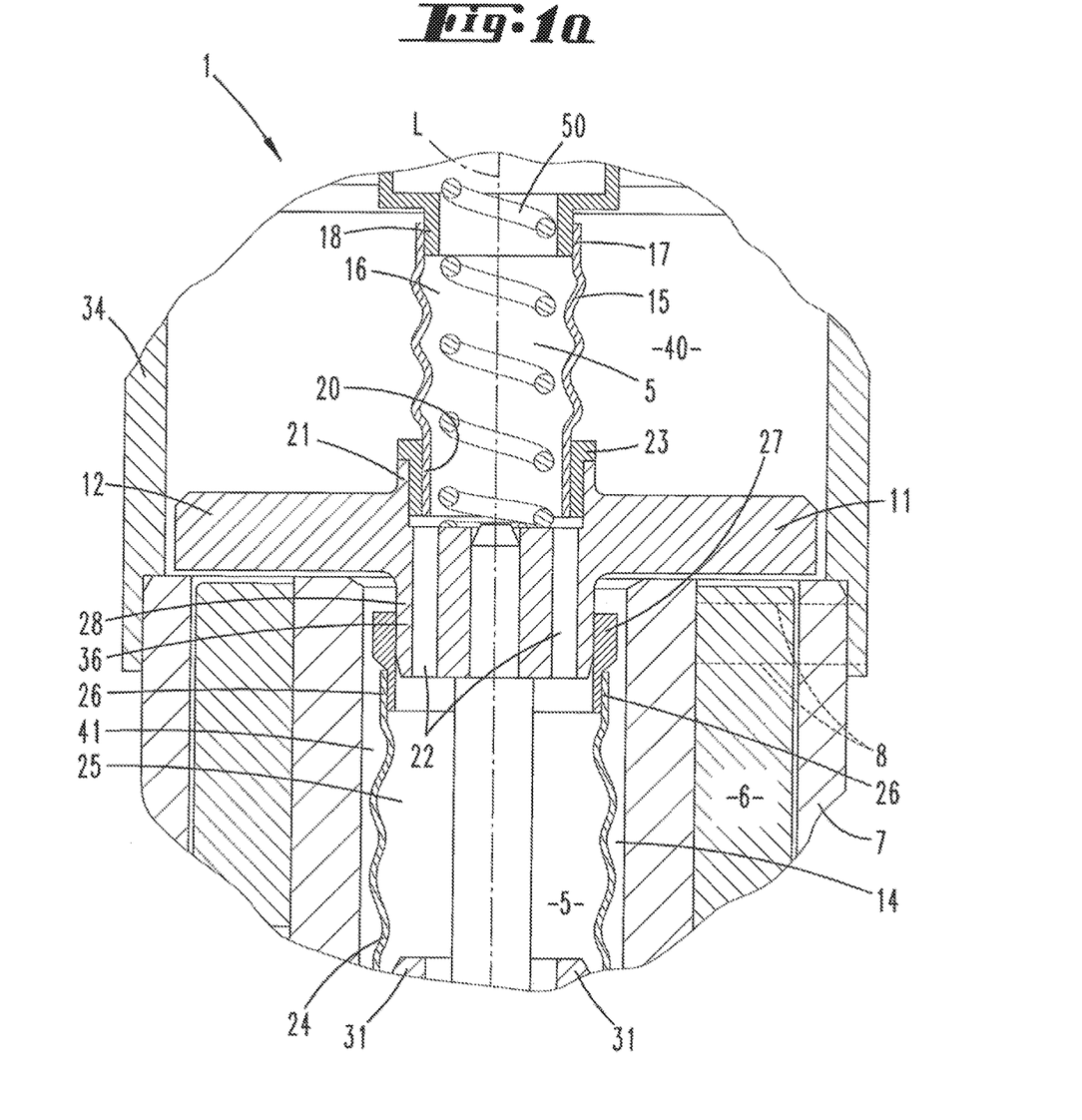
FIG. 1a is an enlarged view of details of the area Ia in FIG. 1.
Figures 2C, 2D:
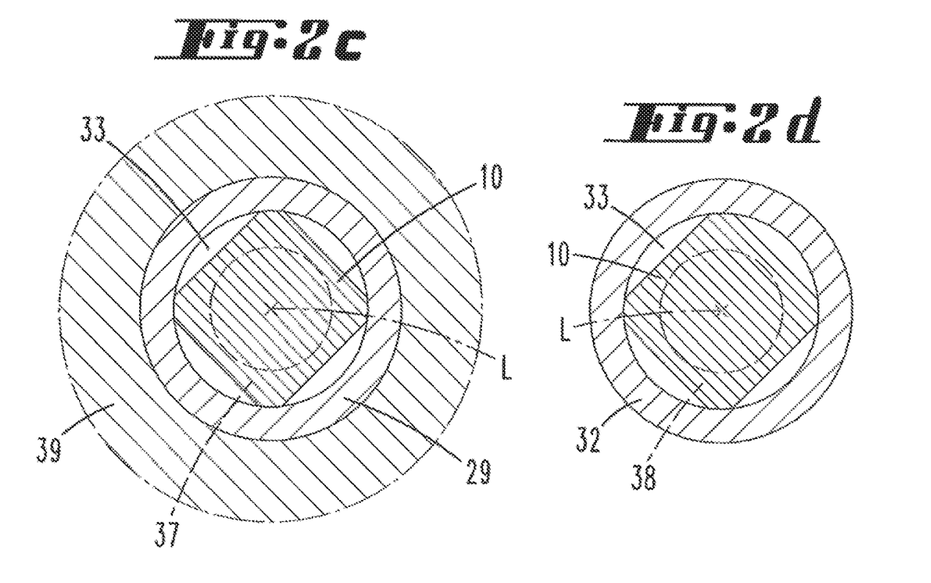
FIG. 2c is an enlarged cross-sectional view along section plane IIc-IIc in FIG. 2.
FIG. 2d is an enlarged cross-sectional view along section plane IId-IId in FIG. 2.

FIGS. 1 and 1b show a closed state of the valve assembly 42, wherein the first circular sealing surface 47 and the second circular sealing surface 48 contact each other in a circular contact area 49, which is closed at its circumferential end and which has a radial extension, so that the contact area 49 is a two-dimensional area, i.e. not merely a line contact. The contact area 49 is flat and extends in a geometric plane, which is perpendicular to the longitudinal axis L.

It is shown from the figures that a cross-section of the second space 25 of the second bellow 24 has a bigger diameter compared to a cross section of the first space 16 of the first bellow 15. In the example, both bellows 15, 24 are made of elastic material, like, for example metal (e.g. steel), plastics or rubber. In the illustrated embodiment, the fluid injector 1 comprises a first compression spring 50 which is axially clamped between the first axial side 21 of the armature 11 and the head section 19. Furthermore, the fluid injector 1 comprises an adjusting means 51, which is adapted to adjust the amount of axial compression of the compression spring 50. In the example embodiment illustrated, the adjusting means 51 is provided by a filter 52, which is axially inserted in the first line section 35 and which may be fixed at different axial positions, for example by means of a screw connection (not shown).

FIG. 1 shows the fluid injector 1, according to the first embodiment, in an operating state in which the valve assembly 42 is closed. The coil 6 is de-energized, i.e. no electrical current is applied. The axial force, which is resulting from the axial forces of the bellows 15, 24 because of their internal pressure and from the axial force of the spring 50, is directed in a direction towards the injector inlet 3. This results in the armature 11 being moved away from the coil 6 and the casing 7, so that the sealing surfaces 47, 48 are pressed together in a sealing manner. If the pressure of a fluid inside the fluid supply lines would increase, this would result in an increasing of the closing force of the valve assembly 42, because of the different diameters of bellows 15 and 24.

On the other hand, FIG. 2 shows the fluid injector 1 with its valve assembly 42 in an opened operating state. For this purpose, the coil 6 is energized by applying electric current thereto. The resulting magnetic force exceeds the resulting axial force of bellows 15, 24 and of spring 50. Accordingly, the armature 11 is attracted in a direction towards the injector outlet 4. Its movement results in a corresponding moving of the closing member 45 in an outward direction away from the valve seat 43. Accordingly, as is shown from the enlarged view of FIG. 2b, a gap 53 is opened for dispensing fluid to the outside of the fluid injector 1.

Figure 3:
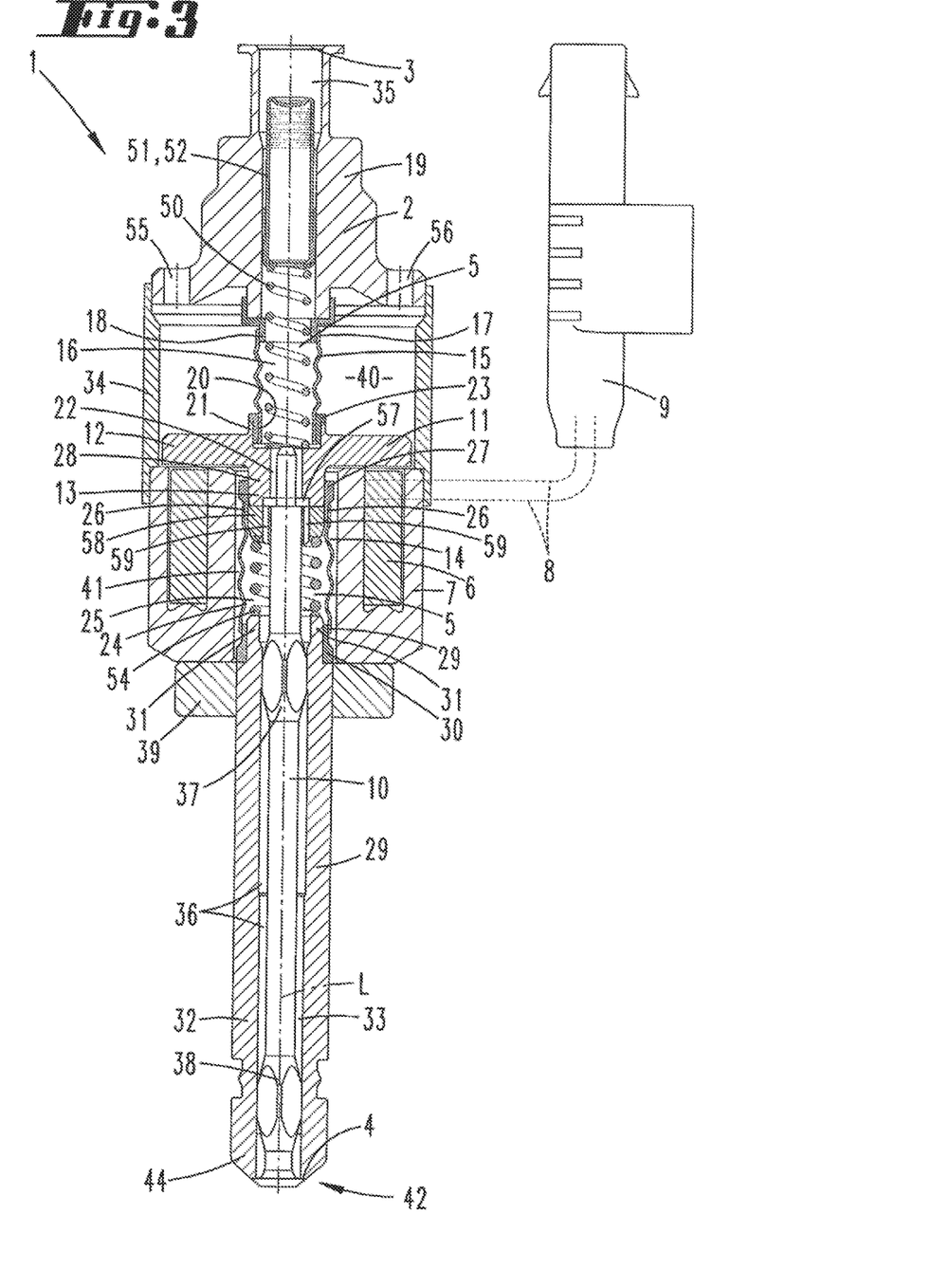
FIG. 3 is a sectional view of a fluid injector according to a second preferred embodiment of the invention in a closed operating state.
Figure 4:
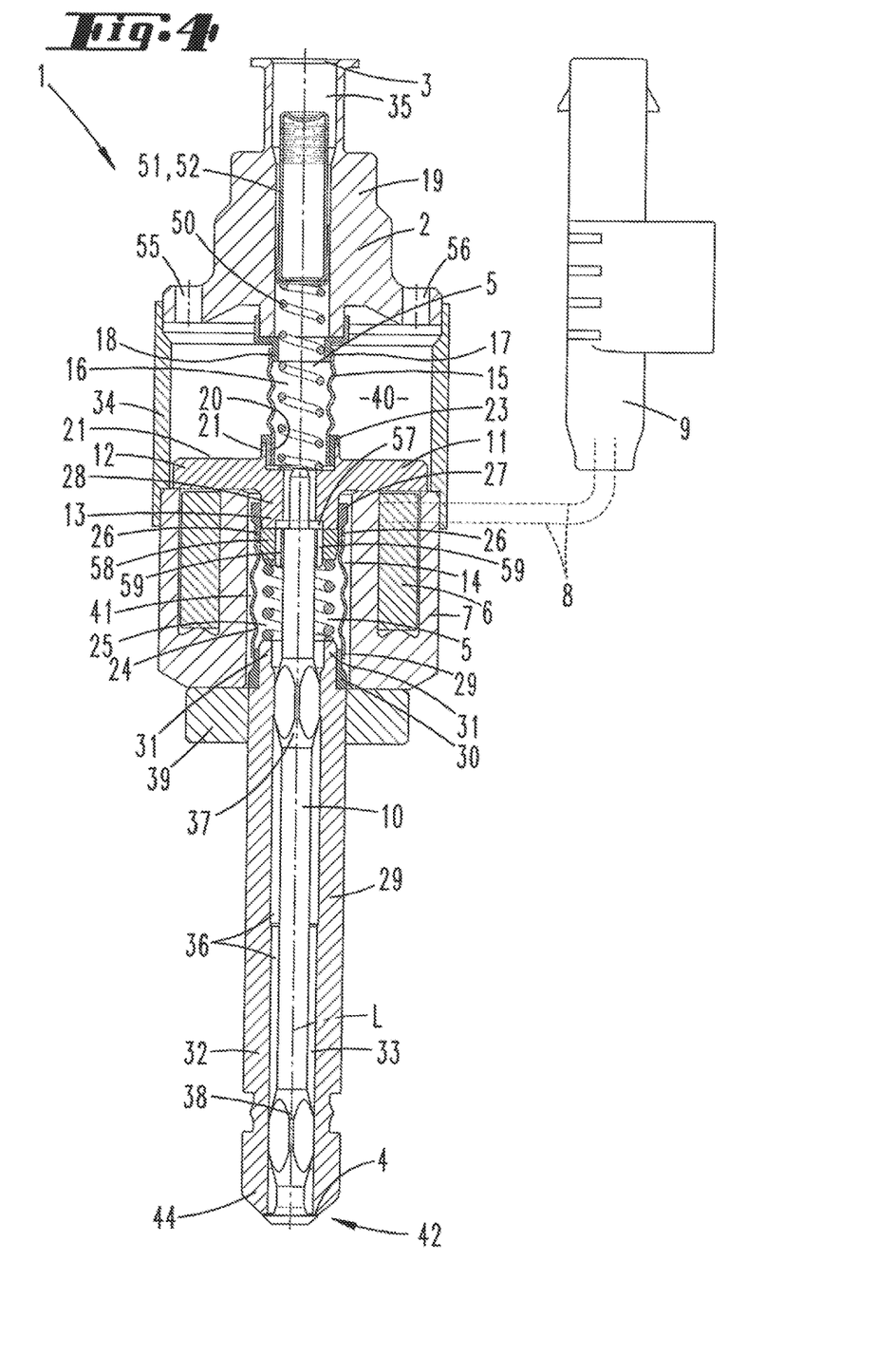
FIG. 4 is a sectional view of the fluid injector of FIG. 3, however in an opened operating state.

FIGS. 3 and 4 refer to a fluid injector 1 according to a second embodiment of the invention. Features and details which correspond or are similar to those of the first embodiment are indicated by the same reference numbers. The second embodiment is similar to the first embodiment. A difference is that the fluid injector 1 comprises a second compression spring 54, which is axially clamped between the second axial side 28 of the armature 11 and the cartridge 32. In more detail, one axial end of the second compression spring 54 is axially supported by a connector 58 which is fixed to the valve needle 10 and to the armature 11, respectively. The connector 58 includes some throughout holes 59 extending parallel to the longitudinal axis L. The throughout holes 59 are laterally spaced from each other and are positioned and distributed at a circumference around the longitudinal axis L. To provide an unbroken fluid path, the throughout holes 59 are in fluid communication with the second space 25 and with a recess 57 of an axial throughout hole 22 in the armature 11, wherein throughout hole 22 is in fluid communication with the first space 16.

Regarding both embodiments, the first bellow 15 is circumferentially surrounded by the hollow cavity 40, which is in fluid communication with a first fluid connector 55. The latter is formed at the head section 19 of the injector housing 2. The fluid connector 55 may be connected to a source of cooled fluid (not shown) in order to supply cooled fluid into the cavity 40 for cooling the first bellow 15 and accordingly the fluid which is inside the bellow. A second fluid connector 56 is provided for discharging the cooled fluid from the fluid injector. In the shown embodiments, the second bellow 24 is circumferentially surrounded by the hollow duct 41, which is also in fluid communication with the fluid connectors 55, 56 for the corresponding purpose. As an alternative, for example a source of heated fluid could be used.

In the figures for explaining the opening state of the valve, the respective gap is schematically shown with exaggerated clearance for better clarity.

The above description of the preferred embodiments is merely exemplary in nature and, thus, variations that do not depart from the gist of the invention are intended to be within the scope thereof. Such variations are not to be regarded as a departure from the spirit and scope of the invention.

The invention claimed is:

1. A fluid injector for direct injection of compressed natural gas into a combustion chamber of a combustion engine, the fluid injector comprising:
  an injector housing;
  an injector inlet, an injector outlet and a fluid supply line extending along a longitudinal axis between the injector inlet and the injector outlet;
  a coil;
  a valve needle being axially moveable parallel to the longitudinal axis;
  an armature mechanically coupled to the valve needle;
  a first bellow surrounding a first space, wherein a first axial end of the first bellow is connected to the injector housing so that the first space is in fluid communication with the injector inlet, and wherein a second axial end of the first bellow is connected to a first axial side of the armature; and
  a second bellow surrounding a second space, wherein a first axial end of the second bellow is connected to a second axial side of the armature, and wherein a second axial end of the second bellow is connected to the injector housing so that the second space is in fluid communication with a section of the fluid supply line, the section of the fluid supply line is adjacent to the injector outlet.

2. The fluid injector according to claim 1, wherein the armature has at least one through-hole extending along the longitudinal axis, the second axial end of the first bellow is connected to the first axial side of the armature so that the first space is in fluid communication with the at least one through-hole, and the first axial end of the second bellow is connected to the second axial side of the armature so that the second space is in fluid communication with the at least one through-hole.

3. The fluid injector according to claim 1, wherein an interior of the fluid supply line is sealed off from the coil, the connections at the first and second axial ends of each of the first and second bellows comprise hermetic welds, the hermetic welds comprising hermetic laser welds.

4. The fluid injector according to claim 1, wherein the fluid injector comprises a valve assembly of the outward opening type.

5. The fluid injector according to claim 4, wherein the valve assembly comprises a valve seat formed at the injector housing, and a closing member which is connected to or formed at an axial end of the valve needle.

6. The fluid injector according to claim 5, wherein the valve seat comprises a first circular sealing surface, the closing member comprises a second circular sealing surface, and in a closed state of the valve assembly, the first circular sealing surface and the second circular sealing surface contact each other in a circular contact area which is closed at a circumference thereof, wherein the circular contact area, by extending along the circumference and by extending in a radial direction has a two-dimensional extension.

7. The fluid injector according to claim 1, wherein the coil is a component of a solenoid circuit, the solenoid circuit comprising a dual pole solenoid circuit.

8. The fluid injector according to claim 1, wherein a cross-section of the space of the second bellow exceeds a cross-section of the space of the first bellow.

9. The fluid injector claim 1, wherein the first bellow and the second bellow are made of elastic material.

10. The fluid injector according to claim 1, further comprising a first compression spring which is axially clamped between the first axial side of the armature and the injector housing.

11. The fluid injector according to claim 10, further comprising an adjusting mechanism adjusting an axial compression of the first compression spring.

12. The fluid injector according to claim 11, further comprising a second compression spring which is axially clamped between the second axial side of the armature and the injector housing.

13. The fluid injector according to claim 10, wherein axial forces of the first bellow, the second bellow and the first compression spring are balanced to each other and to a predetermined gas pressure in the fluid supply line so that in a de-energized state of the coil, the armature is held axially movable in both axial directions in an axial distance away from the coil and away from a casing which surrounds the coil.

14. The fluid injector according to claim 1, wherein the first bellow is circumferentially surrounded by a hollow cavity which is in fluid communication with a fluid connector of the injector housing, the fluid connector is connectable to a source of cooled fluid or to a source of heated fluid, and the second bellow is circumferentially surrounded by a hollow duct which is in fluid communication with a fluid connector of the injector housing, the fluid connector is connectable to a source of cooled fluid or to a source of heated fluid.

15. A fluid injector for direct injection of compressed natural gas into a combustion chamber of a combustion engine, comprising:
an injector housing;
a valve needle; and
a valve assembly of the outward opening type, the valve assembly comprises a valve seat formed at the injector housing, and a closing member which is connected to or formed at an axial end of the valve needle, wherein the valve seat comprises a first circular sealing surface, the closing member comprises a second circular sealing surface, and in a closed state of the valve assembly, the first circular sealing surface and the second circular sealing surface contact each other in a circular contact area which is closed at a circumference thereof, and the circular contact area, by extending along the circumference and by extending in a radial direction, has a two-dimensional extension, the circular contact area being ring shaped.

16. The fluid injector of claim 15, wherein the circular contact area is in a plane that is perpendicular to a longitudinal axis of the fluid injector.

17. The fluid injector of claim 15, further comprising:
an injector inlet and an injector outlet;
a fluid supply line;
an armature mechanically coupled to the valve needle;
a first bellow surrounding a first space, wherein a first axial end of the first bellow is connected to the injector housing, and wherein a second axial end of the first bellow is connected to a first axial side of the armature; and
a second bellow surrounding a second space, wherein a first axial end of the second bellow is connected to a second axial side of the armature, and wherein a second axial end of the second bellow is connected to the injector housing.

18. The fluid injector of claim 17, wherein the first space is in fluid communication with the injector inlet, the second space is in fluid communication with a section of the fluid supply line, and the section of the fluid supply line is adjacent to the injector outlet.

19. The fluid injector according to claim 18, further comprising a first compression spring which is axially clamped between the first axial side of the armature and the injector housing, wherein axial forces of the first bellow, the second bellow and the first compression spring are balanced to each other and to a predetermined gas pressure in the fluid supply line so that in a de-energized state of the coil, the armature is held axially movable in both axial directions an axial distance away from the coil and away from a casing which surrounds the coil.

20. The fluid injector according to claim 17, wherein the first bellow is circumferentially surrounded by a hollow cavity which is in fluid communication with a fluid connector of the injector housing, the fluid connector is connectable to a source of cooled fluid or to a source of heated fluid, and the second bellow is circumferentially surrounded by a hollow duct which is in fluid communication with a fluid connector of the injector housing, the fluid connector is connectable to a source of cooled fluid or to a source of heated fluid.

* * * * *